(12) United States Patent
Dharmaji

(10) Patent No.: US 8,701,051 B2
(45) Date of Patent: Apr. 15, 2014

(54) HOT SPOT USE IN ADVERTISING

(75) Inventor: Srinivasa Dharmaji, Cupertino, CA (US)

(73) Assignee: Goldspot Media, Inc., Sunnyvale, CA (US)

(*) Notice: Subject to any disclaimer, the term of this patent is extended or adjusted under 35 U.S.C. 154(b) by 270 days.

(21) Appl. No.: 13/078,297

(22) Filed: Apr. 1, 2011

(65) Prior Publication Data

US 2011/0178875 A1   Jul. 21, 2011

Related U.S. Application Data

(63) Continuation-in-part of application No. 12/368,141, filed on Feb. 9, 2009, now Pat. No. 8,510,661.

(60) Provisional application No. 61/065,258, filed on Feb. 11, 2008.

(51) Int. Cl.
*G06F 3/14* (2006.01)

(52) U.S. Cl.
USPC .......................... 715/864; 715/749; 705/14.64

(58) Field of Classification Search
USPC ........................................ 715/864; 705/14.64
See application file for complete search history.

(56) References Cited

U.S. PATENT DOCUMENTS

| | | | |
|---|---|---|---|
| 5,914,654 A | 6/1999 | Smith | |
| 6,067,008 A | 5/2000 | Smith | |
| 6,137,834 A | 10/2000 | Wine et al. | |
| 6,182,098 B1 | 1/2001 | Selker | |
| 6,314,451 B1 * | 11/2001 | Landsman et al. | 709/203 |
| 6,317,885 B1 | 11/2001 | Fries | |
| 6,342,926 B1 | 1/2002 | Hahafee et al. | |
| 6,477,575 B1 | 11/2002 | Koeppel et al. | |
| 6,496,857 B1 * | 12/2002 | Dustin et al. | 709/219 |
| 6,505,169 B1 | 1/2003 | Bhagavath et al. | |
| 6,519,571 B1 | 2/2003 | Guheen et al. | |
| 6,647,257 B2 | 11/2003 | Ovensby | |
| 6,698,020 B1 | 2/2004 | Zigmond et al. | |
| 6,711,552 B1 | 3/2004 | Kay | |
| 6,714,992 B1 | 3/2004 | Kanojia et al. | |
| 6,847,992 B1 | 1/2005 | Haitsuka et al. | |
| 6,915,012 B2 | 7/2005 | Osborne et al. | |
| 6,920,606 B1 * | 7/2005 | Jablonski et al. | 715/202 |

(Continued)

FOREIGN PATENT DOCUMENTS

| | | |
|---|---|---|
| GB | 2404751 | 2/2005 |
| JP | 2005-259097 | 9/2005 |

*Primary Examiner* — Shen Shiau
(74) *Attorney, Agent, or Firm* — Michael A. Glenn; Perkins Coie LLP

(57) ABSTRACT

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger and more interactive ads on devices that have small displays. This has created a need to maximize the area available for ad viewing. The need for larger viewing area reduces the area available for call-to-action response enabling switches or inserts on the screen for customer interaction. To overcome this deficiency and provide the necessary end-to-end response capability, hot-spots on the ad image are provided as call-to-action response regions without limitation on the ad viewing area. The use of such hot-spots provides users of MHDDs a preferred interaction mechanism for responding to the advertisement, while maintaining a large ad viewing area.

5 Claims, 4 Drawing Sheets

(56) References Cited

U.S. PATENT DOCUMENTS

| | | |
|---|---|---|
| 7,027,801 B1 | 4/2006 | Hall et al. |
| 7,062,469 B2 | 6/2006 | Meyers et al. |
| 7,271,737 B1 | 9/2007 | Hofberg |
| 7,343,317 B2 | 3/2008 | Jokinen et al. |
| 7,505,920 B2 | 3/2009 | Agarwal et al. |
| 7,516,201 B2 | 4/2009 | Kovacs et al. |
| 7,533,343 B2 | 5/2009 | Ratnakar et al. |
| 7,613,691 B2 | 11/2009 | Finch |
| 7,647,316 B2 | 1/2010 | Patel et al. |
| 7,650,617 B2 | 1/2010 | Hoshino et al. |
| 7,684,790 B2 | 3/2010 | Cartmell |
| 7,720,835 B2 | 5/2010 | Ward et al. |
| 7,724,783 B2 | 5/2010 | Shvodian et al. |
| 7,747,264 B2 | 6/2010 | Fiorini |
| 7,769,633 B2 | 8/2010 | Jokinen et al. |
| 7,775,440 B2 | 8/2010 | Silverbrook et al. |
| 7,778,636 B2 | 8/2010 | Rolf |
| 7,805,444 B2 | 9/2010 | Roche et al. |
| 7,856,372 B2 | 12/2010 | Ullah |
| 7,856,373 B2 | 12/2010 | Ullah |
| 7,861,260 B2 | 12/2010 | Shkedi |
| 8,009,608 B2 | 8/2011 | Karaoguz et al. |
| 8,132,202 B2 | 3/2012 | Swix et al. |
| 2001/0023436 A1 | 9/2001 | Srinivasan et al. |
| 2001/0034654 A1* | 10/2001 | L. Vigil et al. .............. 705/14 |
| 2001/0056405 A1 | 12/2001 | Muyres et al. |
| 2002/0046099 A1 | 4/2002 | Frengut et al. |
| 2002/0055968 A1 | 5/2002 | Wishoff et al. |
| 2002/0083445 A1 | 6/2002 | Flickinger et al. |
| 2002/0087397 A1 | 7/2002 | Mazza |
| 2002/0087976 A1 | 7/2002 | Kaplan et al. |
| 2002/0133405 A1 | 9/2002 | Newnam et al. |
| 2002/0154163 A1 | 10/2002 | Melchner |
| 2002/0166119 A1 | 11/2002 | Cristofalo |
| 2003/0004802 A1 | 1/2003 | Callegari |
| 2003/0028889 A1 | 2/2003 | McCoskey et al. |
| 2003/0131070 A1 | 7/2003 | Stroebel et al. |
| 2003/0137544 A1 | 7/2003 | Mears et al. |
| 2003/0151621 A1 | 8/2003 | Mcevilly et al. |
| 2003/0188308 A1 | 10/2003 | Kizuka et al. |
| 2004/0003118 A1 | 1/2004 | Brown et al. |
| 2004/0073947 A1 | 4/2004 | Gupta et al. |
| 2004/0103120 A1 | 5/2004 | Fickle et al. |
| 2004/0133480 A1 | 7/2004 | Domes |
| 2005/0044021 A1 | 2/2005 | Chande et al. |
| 2005/0149385 A1 | 7/2005 | Trively |
| 2005/0197164 A1 | 9/2005 | Chan |
| 2005/0209923 A1* | 9/2005 | Jablonski et al. .............. 705/14 |
| 2006/0020548 A1* | 1/2006 | Flather .......................... 705/51 |
| 2006/0036488 A1 | 2/2006 | Golan et al. |
| 2006/0074769 A1 | 4/2006 | Looney et al. |
| 2006/0089792 A1 | 4/2006 | Manber et al. |
| 2006/0136297 A1 | 6/2006 | Willis et al. |
| 2006/0168664 A1 | 7/2006 | Frank et al. |
| 2006/0259455 A1 | 11/2006 | Anderson et al. |
| 2006/0294538 A1 | 12/2006 | Li et al. |
| 2007/0047002 A1 | 3/2007 | Hull et al. |
| 2007/0061204 A1 | 3/2007 | Ellis et al. |
| 2007/0061205 A1 | 3/2007 | Crolley |
| 2007/0078712 A1 | 4/2007 | Ott et al. |
| 2007/0088801 A1 | 4/2007 | Levkovitz et al. |
| 2007/0094082 A1 | 4/2007 | Yruski et al. |
| 2007/0101359 A1 | 5/2007 | Schiller et al. |
| 2007/0146200 A1 | 6/2007 | Norin et al. |
| 2007/0198339 A1 | 8/2007 | Shen et al. |
| 2007/0204310 A1 | 8/2007 | Hua et al. |
| 2008/0004957 A1 | 1/2008 | Hildreth et al. |
| 2008/0040743 A1 | 2/2008 | Dharmaji et al. |
| 2008/0040768 A1 | 2/2008 | Robotham |
| 2008/0081640 A1 | 4/2008 | Tran et al. |
| 2008/0103875 A1 | 5/2008 | Kokernak et al. |
| 2008/0114762 A1 | 5/2008 | Fukuda et al. |
| 2008/0182563 A1 | 7/2008 | Wugofski et al. |
| 2008/0189735 A1 | 8/2008 | Barton et al. |
| 2008/0195468 A1 | 8/2008 | Malik |
| 2008/0201734 A1 | 8/2008 | Lyon et al. |
| 2008/0255943 A1 | 10/2008 | Morten et al. |
| 2008/0270886 A1 | 10/2008 | Gossweiler et al. |
| 2008/0288354 A1 | 11/2008 | Flinn et al. |
| 2008/0290987 A1 | 11/2008 | Li |
| 2008/0313029 A1 | 12/2008 | Evans |
| 2008/0318559 A1 | 12/2008 | Porco |
| 2009/0049380 A1 | 2/2009 | Rehling et al. |
| 2009/0106126 A1 | 4/2009 | Asano et al. |
| 2009/0171779 A1 | 7/2009 | Shrivathsan et al. |
| 2009/0197582 A1 | 8/2009 | Lewis et al. |
| 2009/0234861 A1 | 9/2009 | Ramer et al. |
| 2010/0002874 A1 | 1/2010 | Obayashi et al. |
| 2010/0017280 A1 | 1/2010 | Davis et al. |
| 2010/0041422 A1 | 2/2010 | Wormald et al. |
| 2010/0042485 A1 | 2/2010 | Wang et al. |
| 2010/0082435 A1 | 4/2010 | Hartman |
| 2010/0131365 A1 | 5/2010 | Subramanian et al. |
| 2010/0138295 A1 | 6/2010 | Caron et al. |
| 2010/0205049 A1 | 8/2010 | Long et al. |
| 2010/0228611 A1 | 9/2010 | Shenfield |
| 2010/0228617 A1 | 9/2010 | Ransom et al. |
| 2010/0235891 A1 | 9/2010 | Oglesbee et al. |
| 2010/0250351 A1 | 9/2010 | Gillenson et al. |
| 2010/0250368 A1 | 9/2010 | Porco |
| 2010/0274661 A1 | 10/2010 | Aaltonen et al. |
| 2010/0274673 A1 | 10/2010 | Isaac |
| 2011/0029363 A1 | 2/2011 | Gillenson et al. |
| 2011/0040627 A1 | 2/2011 | Brewer et al. |
| 2011/0060651 A1* | 3/2011 | Choi ...................... 705/14.54 |
| 2011/0184790 A1 | 7/2011 | Deol Brar et al. |
| 2011/0184810 A1 | 7/2011 | Dharmaji |

\* cited by examiner

HOT SPOT USE IN ADVERTISING

CROSS REFERENCE TO RELATED APPLICATIONS

This application is a continuation-in-part of U.S. patent application Ser. No. 12/368,141, End-To-End Response Enabling Collection and Use Of Customer Viewing Preference Statistics, filed Feb. 9, 2009 now U.S. Pat. No. 8,510,661, which application claims priority from U.S. provisional patent application Ser. No. 61/065,258, End-To-End Response Enabling Collection and Use Of Customer Viewing Preference Statistics, filed Feb. 11, 2008, each of which is incorporated herein in its entirety by this reference thereto.

BACKGROUND OF THE INVENTION

1. Technical Field

The invention relates to advertisements (ads) and content viewing on wireless enabled mobile handheld display devices (MHDDs). More specifically, the invention relates to the delivery of large targeted ads to MHDDs, and to providing the capability for client specific responses and feedback with regard to these ads.

2. Description of the Background Art

The use of mobile hand held display devices (MHDDs) has been increasing very fast. Providing selective delivery of focused advertisements (ads) to different groups of target mobile viewers with wireless enabled MHDD users in the total population is becoming more and more important and valuable. There is limited capability of delivering customer/group specific ads, and specific preferred ad interaction methods to target mobile viewer groups are limited as well, but such ad delivery is increasing. The ads and their content must be delivered to the MHDDs, and responses are collected back, using interactive call-to-action enablers, such as switches or inserts instantiated on the display of the MHDDs.

The advent of online ad conversion tools for display on MHDDs allows ads in one format to be converted to another format. An example is the Adobe® Wallaby tool (see http://labs.adobe.com/technologies/wallaby/) which converts Flash® ads to hypertext markup language 5 (HTML5) ads. Wallaby does not support call-to-action, although the animations related to the ad are preserved. It would be advantageous for mobile advertisers to repurpose online ads for MHDD if call-to-action can be added to the ad.

FIG. 1 is a block schematic representation of an MHDD display that shows a prior art instantiation 100 of the call-to-action enablers on the display screen 102 of the MHDD 100. The call-to-action enablers, such as Click-to-Call, Click-to-Browse, Click-to-Jump page, Click-to-Message, Click-to-Mail, Click-to-Bookmark, Click-to-Share, Click-to-Video, Click-to-Ad Unit, Click-to-Download, etc. are instantiated switches 111 and 112 and inserts 113 that take up space 104 on the display screen 102, thus limiting the space available 103 for display of the ad.

The ads that have to be delivered are becoming more elaborate and require larger viewing area for full assimilation. This has limited the area available for response enablers to be instantiated on the handheld displays. This creates a problem because the return on investment for ads is closely related to the collected and compiled responses from the MHDD users, which provides development and updating capability for focusing the ads. Hence, the capability to respond to ads using preferred interaction methods and collection of their response to advertisements is of utmost importance. A capability for end-to-end user interaction with ads would be essential to enhance the impact of the ads. A capability that maximizes the viewing area while providing for end-to-end user interaction with the ads via the user's preferred response method would be an advantageous solution that would enhance the ads' effectiveness and return.

SUMMARY OF THE INVENTION

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger and more interactive ads on devices that have small displays. This has created a need to maximize the area available for ad viewing. The need for larger viewing area reduces the area available for call-to-action response enabling switches or inserts on the screen for customer interaction. To overcome this deficiency and provide the necessary end-to-end response capability, hot-spots on the ad image are provided as call-to-action response regions without limitation on the ad viewing area. The use of such hot-spots provides users of MHDDs a preferred interaction mechanism for responding to the advertisement, while maintaining a large ad viewing area.

DETAILED DESCRIPTION OF THE INVENTION

Figure 1:
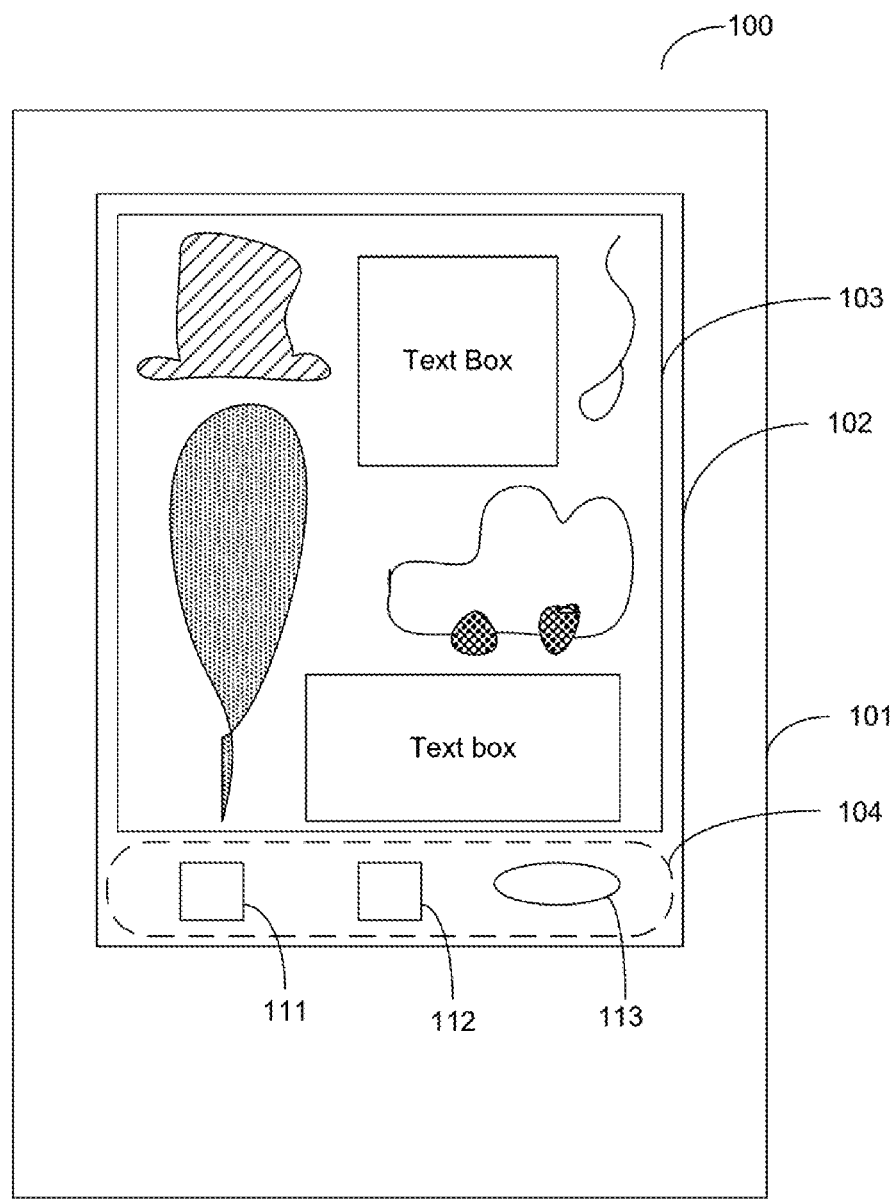
FIG. 1 is a block schematic representation of an MHDD display that shows a prior art instantiation of the call-to-action enablers on the display screen of the MHDD.

The delivery of targeted advertisements (ads) to wireless mobile handheld display devices (MHDDs) with client specific advertisement and dynamic content for response and feedback is becoming important in advertising. As the return for ads on MHDDs becomes higher, there is a push to show larger and more interactive ads on devices that have small displays. This has created a need to maximize the area available for ad viewing. The need for larger viewing area reduces the area available for call-to-action response enabling switches or inserts on the screen for customer interaction. To overcome this deficiency and provide the necessary end-to-end response capability, hot-spots on the ad image are provided as call-to-action response regions without limitation on the ad viewing area. The use of such hot-spots provides users of MHDDs a preferred interaction mechanism for responding to the advertisement, while maintaining a large ad viewing area.

To provide a real-time response capability to alternate content or ads inserted into a video content stream during content viewing, it is necessary to provide ads which have dynamic content and static message content, as specified by the ads. It also necessary that the dynamic content is specific and focused to each target group, e.g. as defined by the location, the expressed interest, and response mode or method that the individual prefers, such as on screen response, short message service (SMS), keyboard, email, call-back, etc. Most of this preference information is pre-known and stored on the MHDD 101 to enable the MHDD 101 to download the right ads selectively, as described in U.S. patent application Ser. No. 12/368,141, which application is incorporated herein in its entirety by this reference thereto. The response method options typically provided to a user of an MHDD can include, for example, Click-to-Call, Click-to-Browse, Click-to-Jump page, Click-to-Video, Click-to-Ad Unit, Click-to-Message, Click-to-Mail, Click-to-Bookmark, Click-to-Share, Click-to-Download, etc. By generating and focusing the dynamic and static content of an alternate content or ad to a target group, and by providing the customer with a preferred interaction mode, it is possible to improve the impact of the ad on the user.

Another requirement that is becoming more important is the need for larger and more complex ads to be displayed on the small MHDD screens. By enabling larger ads it is possible to increase the impact of the focused ads further. This results in increased interaction in the form of response and feedback from the person who views the ad. Such an end-to-end interaction in the form of a response or feedback is of great value to any ad campaign because it enables the optimization of the impact of current and future ad campaigns.

In the case of ad conversions using the conversion tools available, such as the Adobe® Wallaby tool which converts Flash® ads into HTML5 ads, earmarking certain areas of the ad real estate with mobile specific calls-to-action is needed. These earmarked areas of the ad associated with call-to-action enablers, specifically for different device resolutions, and target groups of mobile consumers. By inserting transparent hot-spots onto different animations in the earmarked areas within the re-purposed ad, and by associating the call-to-action enablers to these hot-spots, the converted ads can be enabled for end-to-end interaction with full capabilities for display on MHDDs 101.

Figure 2:
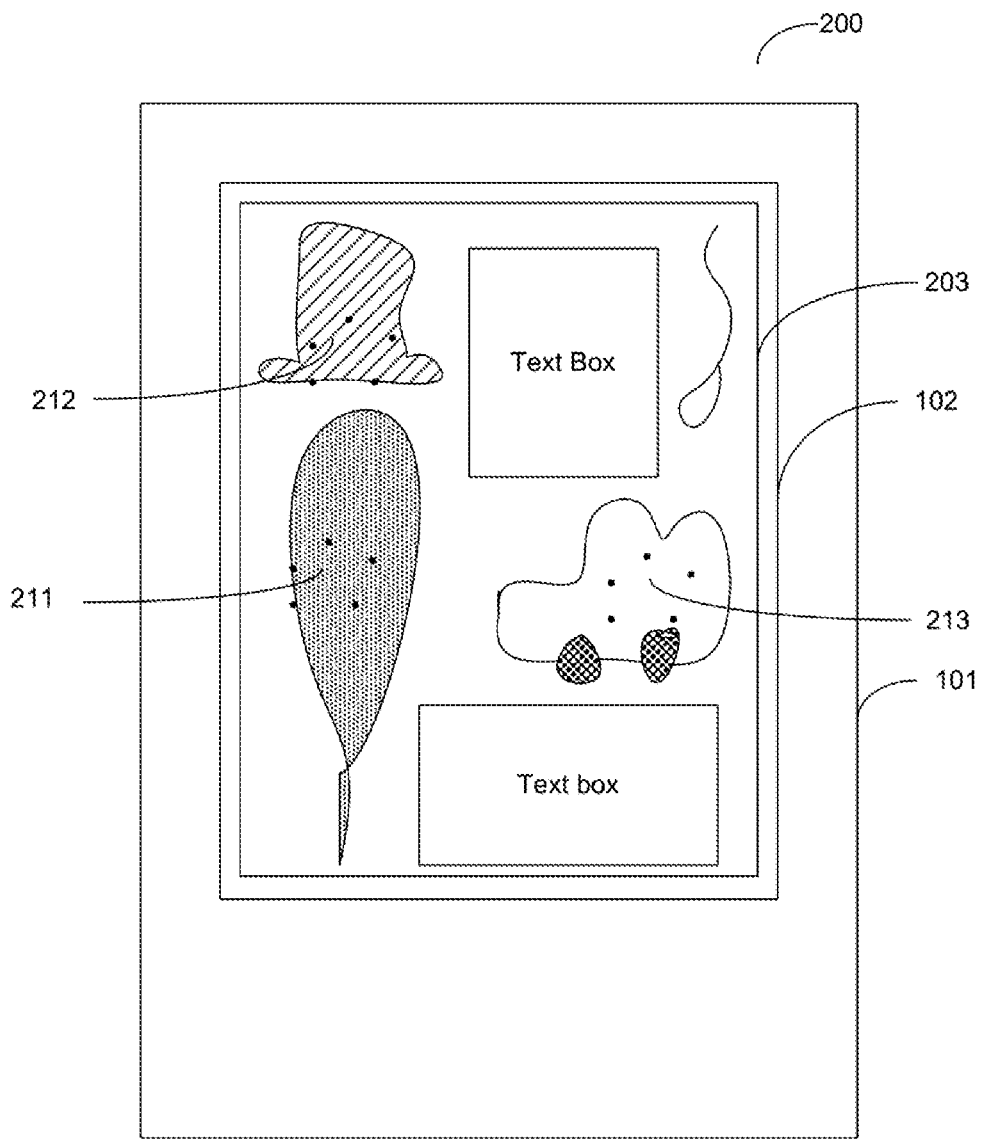
FIG. 2 is a block schematic representation of an MHDD display that shows hot-spots instantiated on the displayed ad in accordance with the invention.

FIG. 2 is a block schematic representation 200 of an MHDD display that shows hot-spots instantiated on the displayed ad to allow the maximization of the area for ad display, while providing the capabilities to the user for preferred choice of interaction. By use of transparent markers or hot-spots 211, 212, and 213, that have user specific call-to-action enablers for activities associated with them, typically on the ad images within the ads, the available space for display 203 for the ad on the display screen 102 of the MHDD 101 can be maximized. This is done by eliminating the switches and inserts 111, 112, 113 of the prior art and thus saving the area 104 necessary on the screen 102 for their instantiation. Because the hot-spots 211, 212, 213 can be made transparent they do not restrict the viewing of the full ad display on the display screen 102 of the MHDD 101.

The transparent hot-spots 211, 212, and 213 attached to the various components of the ad can be assigned a preferred set of different calls-to-action for the user of the MHDD 101, based on user preferences stored on the MHDD 101. Here, again. the preferred call-to-action can be chosen from the list of call-to-action enablers, e.g. Click-to-Call, Click-to-Browse, Click-to-Jump page, Click-to-Message, Click-to-Video, Click-to-Ad Unit, Click-to-Mail, Click-to-Bookmark, Click-to-Share, or Click-to-Download, all of which can also be downloaded on to the MHDD.

In the typical case, a processor on the MHDD selects the call-to-action enablers to be used. This selection is based on the pre-stored preference of the user on the MHDD 101. Ads having a transparent marker or hot-spot 211, 212, 213 are downloaded by the MHDD 101. A processor on the MHDD 101 enables the association of the chosen call-to-action with the hot-spots instantiated on the ad, modifying the ad for dynamic customer interaction. During viewing of content, the ad is rendered and displayed at an appropriate ad spot within the content stream. The complex images and ads created by the studios and other ad agencies for specific ad campaigns can remain essentially unaltered and use the maximum allowed area 203 of the display screen 102 of the MHDD 101 for display of the ad. This is achieved by eliminating the area 104 on the display screen 102 used in the prior art to instantiate the switches 111, 112 and insert 113 (see FIG. 1). A key difference being that the non-interactive ad image is now made into an interactive image that includes the transparent hot-spots assigned to the set of user preferred call-to-action enablers for activity generation within the image itself. The user of the MHDD 101 can, for example, move a cursor over the image to a region containing a transparent hot-spot 212, making the hotspot 212 visible and enabled for a preferred call-to-action activity, thereby initiating that preferred activity and interacting with the ad displayed on the display screen 102.

Figure 3:
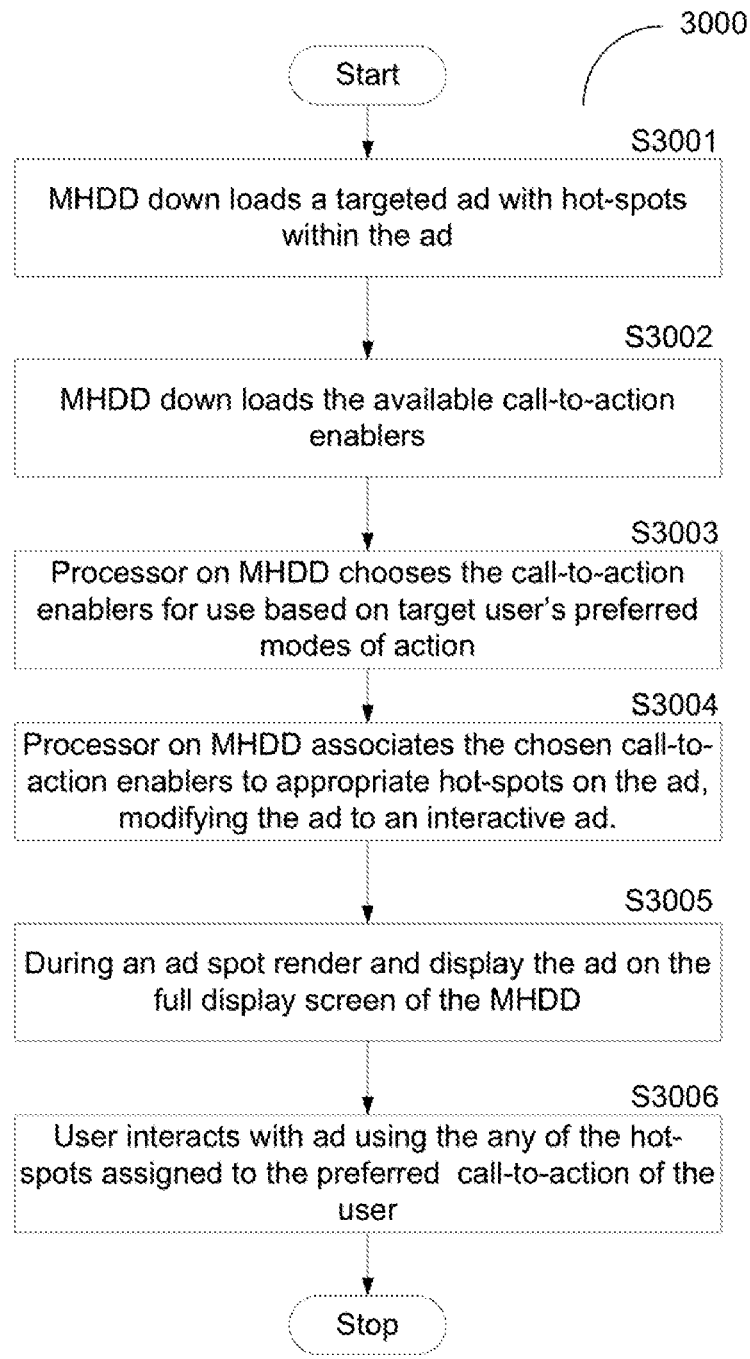
FIG. 3 is a flow chart showing the use of transparent hot-spots to make the full display screen available for ad display, while still providing the capability for customer interaction and feedback, according to the invention.

FIG. 3 is a flow chart 3000 showing the use of transparent hot-spots to make the full display screen available for ad display, while still providing the capability for customer interaction and feedback.

A targeted ad 203 developed for a target users, and having assignable transparent hot-spots 211, 212, 213 is downloaded by the MHDD 101. The ad 203 contains both dynamic and static components covering the message to be conveyed (S3001).

The available call-to-action enablers are downloaded by the MHDD 101 (S3002).

The processor on the MHDD 101 checks the call-to-action enablers against the known preferred modes of activity of the target user of the MHDD 101, and chooses the preferred call-to-action enablers from the available downloaded call-to-action enablers (S3003).

The processor also associates the chosen call-to-action enablers with the appropriate hot-spots 211, 212, 213 on the ad, making the non-interactive ad into an interactive ad (S3004).

During an ad spot, the ad 203 is rendered and displayed on the screen 102 of the MHDD 101 (S3005). The use of the transparent hot-spots 211, 212, 213 assigned to the call-to-action enablers eliminates the need to have switches and inserts 111, 112, 113 instantiated separately on the screen using up area 104. This allows the whole display screen 102 to be used for the ad 203 display.

The user is enabled to interact with the ad 203 using the hot-spots 211, 212, 213 on screen to provide the required call-to-action activity and feedback (S3006).

Hence, this method of using transparent hot-spots 211, 212, 213 within the ad 203 enables user interaction and feedback, while allowing the use of the whole display screen 102 of the MHDD 101 for the ad 203 display.

The use of a transparent hot-spot or a marker within the ads provides the best solution for maximizing the display area for the ad 203 within the total available display area 102 of the MHDD 101, while providing for all the preferred modes of end-to-end response to the consumer.

Computer Implementation

Figure 4:
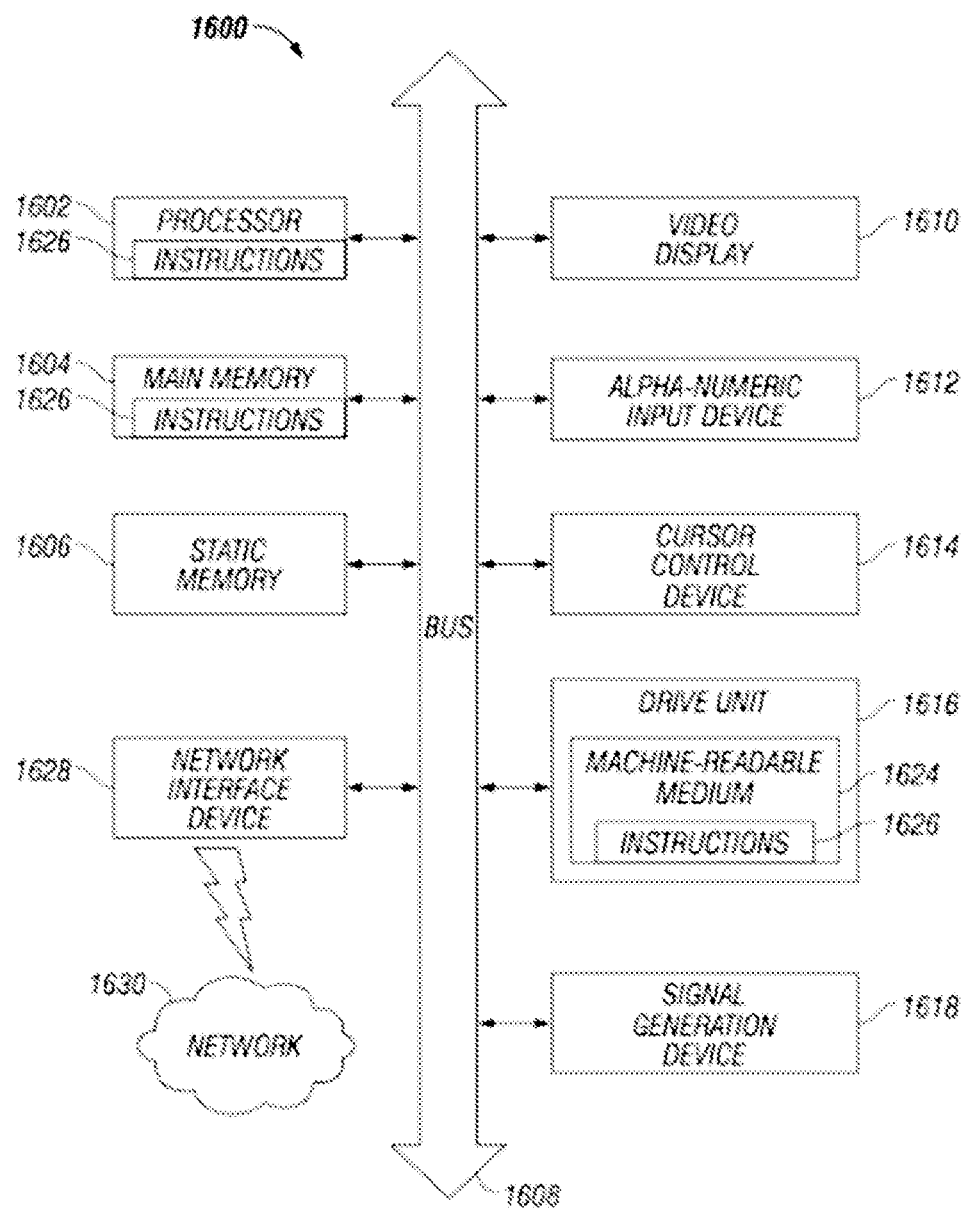
FIG. 4 is a block schematic diagram of a machine in the exemplary form of a computer system within which a set of instructions for causing the machine to perform any one of the herein disclosed methodologies may be executed.

FIG. 4 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

The invention disclosed herein may be embodied in software designed to execute on a specific hardware platform, firmware, hardware, or any combination thereof.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method of displaying targeted advertisements (ad) on a mobile hand held display device (MHDD), comprising:
a processor downloading a targeted ad comprising dynamic and static content into an MHDD and storing said ad in an MHDD storage medium;
wherein said ad is directed to a target group of users of MHDDs; and
wherein said ad comprises a plurality of transparent hot-spots;
in a separate step, said processor also downloading a plurality of call-to-action enablers into said MHDD and storing said call-to-action enablers in said MHDD storage medium;
said processor checking said call-to-action enablers against one or more preferred modes of activity of a target user of said MHDD and choosing one or more preferred call-to-action enablers from among said downloaded call-to-action enablers for use with said downloaded ad based upon said one or more preferred modes of activity of a target user of said MHDD;
said processor making said ad interactive by associating at least one of said chosen call-to-action enablers with appropriate hot-spots from among said plurality of hot-spots;
said processor rendering and displaying said ad on the MHDD during an ad spot;
said processor providing said MHDD user with a choice of a preferred response mode to said ad from among said set of call-to-action enablers when said user selects at least one hot-spot from said plurality of hot-spots in said ad; and
said processor enabling said user to respond to said ad by selecting a hot spot and thereby invoking a call-to-action enabler associated with said hot-spot;
wherein said ad is displayed in a maximum available display area said MHDD display while maintaining user interactivity with said ad via said hot spots.

2. The method of claim 1, said call-to-action enablers, upon user selection of a hot spot, invoking actions comprising any of Click-to-Call, Click-to-Browse, Click-to-Jump page, Click-to-Video, Click-to-Ad Unit, Click-to-Message, Click-to-Mail, Click-to-Bookmark, Click-to-Share, and Click-to-Download.

3. An apparatus for displaying targeted advertisements (ad) on a mobile hand held display device (MHDD), comprising:
a processor configured for downloading a targeted ad comprising dynamic and static content into an MHDD and storing said ad in an MHDD storage medium;
wherein said ad is directed to a target group of users of MHDDs; and
wherein said ad comprises a plurality of transparent hot-spots;
said processor configured for, in a separate step, also downloading a plurality of call-to-action enablers into said MHDD and storing said call-to-action enablers in said MHDD storage medium;
said processor configured for checking said call-to-action enablers against one or more preferred modes of activity of a target user of said MHDD and choosing one or more preferred call-to-action enablers from among said downloaded call-to-action enablers for use with said downloaded ad based upon said one or more preferred modes of activity of a target user of said MHDD;
said processor configured for making said ad interactive by associating at least one of said chosen call-to-action enablers with appropriate hot-spots from among said plurality of hot-spots;
said processor configured for rendering and displaying said ad on the MHDD during an ad spot;

said processor configured for providing said MHDD user with a choice of a preferred response mode to said ad from among said set of call-to-action enablers when said user selects at least one hot-spot from said plurality of hot-spots in said ad; and said processor configured for enabling said user to respond to said ad by selecting a hot spot and thereby invoking a call-to-action enabler associated with said hot-spot;

wherein said ad is displayed in a maximum available display area said MHDD display while maintaining user interactivity with said ad via said hot spots.

4. A non-transitory storage medium containing program instructions which, when executed by a processor, implement a method of displaying targeted advertisements (ad) on a mobile hand held display device (MHDD), comprising:

a processor downloading a targeted ad comprising dynamic and static content into an MHDD and storing said ad in an MHDD storage medium;

wherein said ad is directed to a target group of users of MHDDs; and wherein said ad comprises a plurality of transparent hot-spots;

said processor, in a separate step, also downloading a plurality of call-to-action enablers into said MHDD and storing said call-to-action enablers in said MHDD storage medium;

said processor checking said call-to-action enablers against one or more preferred modes of activity of a target user of said MHDD and choosing one or more preferred call-to-action enablers from among said downloaded call-to-action enablers for use with said downloaded ad based upon said one or more preferred modes of activity of a target user of said MHDD;

said processor making said ad interactive by associating at least one of said chosen call-to-action enablers with appropriate hot-spots from among said plurality of hot-spots;

said processor rendering and displaying said ad on the MHDD during an ad spot;

said processor providing said MHDD user with a choice of a preferred response mode to said ad from among said set of call-to-action enablers when said user selects at least one hot-spot from said plurality of hot-spots in said ad; and said processor enabling said user to respond to said ad by selecting a hot spot and thereby invoking a call-to-action enabler associated with said hot-spot;

wherein said ad is displayed in a maximum available display area said MHDD display while maintaining user interactivity with said ad via said hot spots.

5. A method of displaying targeted advertisements (ad) on a mobile hand held display device (MHDD), comprising:

a processor downloading a targeted ad comprising dynamic and static content into an MHDD and storing said ad in an MHDD storage medium;

wherein said ad is directed to a target group of users of MHDDs; and wherein said ad comprises a plurality of transparent hot-spots;

in a separate step, said processor also downloading a plurality of call-to-action enablers into said MHDD and storing said call-to-action enablers in said MHDD storage medium;

said processor checking said call-to-action enablers against one or more preferred modes of activity of a target user of said MHDD and choosing one or more preferred call-to-action enablers from among said downloaded call-to-action enablers for use with said downloaded ad based upon said one or more preferred modes of activity of a target user of said MHDD;

said processor making said ad interactive by associating at least one of said chosen call-to-action enablers with appropriate hot-spots from among said plurality of hot-spots; and said processor rendering and displaying said ad on the MHDD during an ad spot.

* * * * *